US012614912B2

(12) United States Patent
Jung et al.

(10) Patent No.:    US 12,614,912 B2
(45) Date of Patent:    Apr. 28, 2026

(54) CHARGING POWER FILTERING METHOD AND DEVICE

(71) Applicants: Hyundai Motor Company, Seoul (KR); Kia Corporation, Seoul (KR)

(72) Inventors: Ho Young Jung, Hwaseong-si (KR); Bo Kyung Yoon, Incheon (KR); Byeong Seob Song, Suwon-si (KR); Jae Hyuk Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 696 days.

(21) Appl. No.: 18/062,281

(22) Filed: Dec. 6, 2022

(65) Prior Publication Data

US 2024/0022086 A1    Jan. 18, 2024

(30) Foreign Application Priority Data

Jul. 15, 2022    (KR) ......................... 10-2022-0087625

(51) Int. Cl.
*H02J 7/00* (2026.01)
*H02J 7/34* (2006.01)

(52) U.S. Cl.
CPC .......... *H02J 7/00047* (2020.01); *H02J 7/345* (2013.01); *H02J 2310/48* (2020.01)

(58) Field of Classification Search
CPC .................................................. H02J 7/00047
USPC .......................................................... 320/107
See application file for complete search history.

(56) References Cited

U.S. PATENT DOCUMENTS

| | | | |
|---|---|---|---|
| 9,758,047 B2 | 9/2017 | Hou et al. | |
| 2003/0210014 A1* | 11/2003 | Jabaji | H02J 7/007182 |
| | | | 320/104 |
| 2015/0015190 A1* | 1/2015 | Tischer | H02J 7/00 |
| | | | 320/152 |
| 2016/0094151 A1 | 3/2016 | Goh et al. | |
| 2019/0013692 A1* | 1/2019 | Dellevergini | H02J 7/345 |
| 2020/0295660 A1* | 9/2020 | Oguma | H02J 7/342 |

* cited by examiner

*Primary Examiner* — Yalkew Fantu
(74) *Attorney, Agent, or Firm* — Slater Matsil, LLP

(57) ABSTRACT

An embodiment charging power filtering method includes receiving a signal instructing whether or not a filtering request is required from an on-board charger, selecting a mode of a plurality of modes for driving a filter based on the signal instructing whether or not the filtering request is required, and charging a battery using the selected mode.

20 Claims, 22 Drawing Sheets

FIG. 6

CHARGING POWER FILTERING METHOD AND DEVICE

CROSS-REFERENCE TO RELATED APPLICATIONS

This application claims the benefit of Korean Patent Application No. 10-2022-0087625, filed on Jul. 15, 2022, which application is hereby incorporated herein by reference.

TECHNICAL FIELD

The present invention relates to a charging power filtering method and device.

BACKGROUND

Recently, with increasing interest in the environment, eco-friendly vehicles having an electric motor as a power source are increasing. An eco-friendly vehicle is also referred to as an electrified vehicle, and a representative example may include a hybrid electric vehicle (HEV) or an electric vehicle (EV).

When charging using alternating current (AC) power in a conventional eco-friendly vehicle, an on-board charger (OBC), which is a power conversion device inside the vehicle, is used. The power conversion device receives three-phase or single-phase AC power, thereby converting and supplying the power, and output power may include low-order harmonics that are not removed. In a two-stage structure and a one-stage structure used in a conventional OBC, a filtering system, in which a switch or a passive element is added to another power conversion device inside the OBC or inside the vehicle, is used in order to remove the low-order harmonics.

Currently, as the volume of internal devices or seats increases in order to improve the performance and convenience of the vehicle when an electric vehicle is developed, it is required to reduce the volume of the power converter/ power conversion device. However, in the existing filtering system for removing low-order harmonics, since the low-order harmonics are removed by using an additional element, there is a problem in that the volume and cost increase. In addition, when an additional element is used for another power conversion device inside the vehicle among the existing charging systems, because a power conversion device that is to be operated simultaneously with the charging system is used, there occurs limitations on the charging operation.

Therefore, in the present technical field, it is highly required for a charging power filtering technology that may utilize the element inside the vehicle without introducing additional elements, thereby reducing the volume and cost and that may remove the low-order harmonics even without simultaneously operating with the charging power converter/power conversion device.

The foregoing is intended merely to aid in the understanding of the background of embodiments of the present invention and is not intended to mean that the present invention falls within the purview of the related art that is already known to those skilled in the art.

SUMMARY

The present invention relates to a charging power filtering method and device. Particular embodiments relate to a charging power filtering method and device configured to remove low-order harmonics using an on-board motor inverter or a high voltage converter in an eco-friendly vehicle.

Accordingly, embodiments of the present invention keep in mind problems occurring in the related art, and an embodiment of the present invention provides a charging power filtering method and device that may reduce the volume and cost by utilizing the element inside an existing vehicle without introducing additional elements.

Another embodiment of the present invention provides a charging power filtering method and device that may remove the low-order harmonics even without being simultaneously operated with a charging power conversion device.

The features achievable by embodiments the present invention are not limited to the features mentioned above, and other features not mentioned will be clearly understood by those of ordinary skill in the art to which the present invention belongs from the description below.

According to one embodiment of the present invention, there may be provided a charging power filtering method, the method including receiving a signal instructing whether or not a filtering request is required from an on-board charger, selecting one of a plurality of modes for driving a filter on the basis of the signal instructing whether or not a filtering request is required, and charging a battery using a selected mode.

Here, the filter may include a high voltage DC-DC converter (HDC) filter or a filter having a motor and an inverter coupled with each other therein.

Here, the filter may be connected in series or parallel to the on-board charger.

Here, when the filter is connected in series to the on-board charger, the plurality of modes may include a filtering mode removing a harmonic signal and a filtering stop mode not removing the harmonic signal.

Here, when the filter is connected in parallel to the on-board charger, the plurality of modes may include a filtering mode removing a harmonic signal, a filtering stop mode not removing the harmonic signal, or an initial charging mode performing initial charging to a harmonic storage capacitor.

Here, by determining whether or not the initial charging of the harmonic storage capacitor is required, the selecting one of a plurality of modes may further include performing the initial charging mode when it is determined the initial charging is required and switching to the filtering mode when it is determined the initial charging has been completed.

Here, whether or not the initial charging of the harmonic storage capacitor is required may be determined on the basis of a comparison result of a voltage of the harmonic storage capacitor and a preset first threshold value.

Here, the first threshold value may be determined on the basis of a voltage of the battery.

Here, whether or not the initial charging has been completed may be determined on the basis of a comparison result between the voltage of the charging capacitor and a preset second threshold value.

Here, the second threshold value may be determined on the basis of the voltage of the battery.

In addition, according to one embodiment of the present invention, there may be provided a charging power filtering device, the device including an AC power supply, an on-board charger (OBC) configured to convert input power from the AC power supply into DC power, a filter operating in one of a plurality of modes, thereby removing a harmonic signal from the converted DC power, and a battery charged by receiving power from which the harmonic signal is removed by the filter.

Here, the filter may include a high voltage DC-DC converter (HDC) filter or a filter having a motor and an inverter coupled with each other therein.

Here, the filter may be connected in series or parallel to the on-board charger.

Here, when the filter is connected in series to the on-board charger, the plurality of modes may include a filtering mode removing a harmonic signal and a filtering stop mode not removing the harmonic signal.

Here, when the filter is connected in parallel to the on-board charger, the plurality of modes may include a filtering mode removing a harmonic signal, a filtering stop mode not removing the harmonic signal, or an initial charging mode performing initial charging to a harmonic storage capacitor.

Here, the device may further include a controller that, by determining whether or not the initial charging of the harmonic storage capacitor is required, may set the filter to the initial charging mode when it is determined that the initial charging is required and to the filtering mode when it is determined that the initial charging has been completed.

Here, whether or not the initial charging of the harmonic storage capacitor is required may be determined on the basis of a comparison result of a voltage of the harmonic storage capacitor and a preset first threshold value.

Here, the first threshold value may be determined on the basis of a voltage of the battery.

Here, whether or not the initial charging has been completed may be determined on the basis of a comparison result between the voltage of the charging capacitor and a preset second threshold value.

Here, the second threshold value may be determined on the basis of the voltage of the battery.

According to various embodiments of the present invention, as described above, the volume and cost of a power conversion device can be minimized by using a motor inverter or a high voltage converter, which is a circuit existing inside the vehicle, as an active filter without introducing additional elements.

In addition, it is possible to remove the low-order harmonics without having the low-order harmonics removal filter simultaneously operated with the power conversion device.

The effects obtainable by embodiments of the present invention are not limited to the above-mentioned effects, and other effects not mentioned may be clearly understood by those of ordinary skill in the art to which the present invention belongs from the description below.

BRIEF DESCRIPTION OF THE DRAWINGS

The above and other objectives, features, and other advantages of embodiments of the present invention will be more clearly understood from the following detailed description when taken in conjunction with the accompanying drawings, in which:

FIG. 6 shows a current flow in a filtering stop mode of a power filtering system according to an embodiment of the present invention;

DETAILED DESCRIPTION OF ILLUSTRATIVE EMBODIMENTS

Figure 1A:
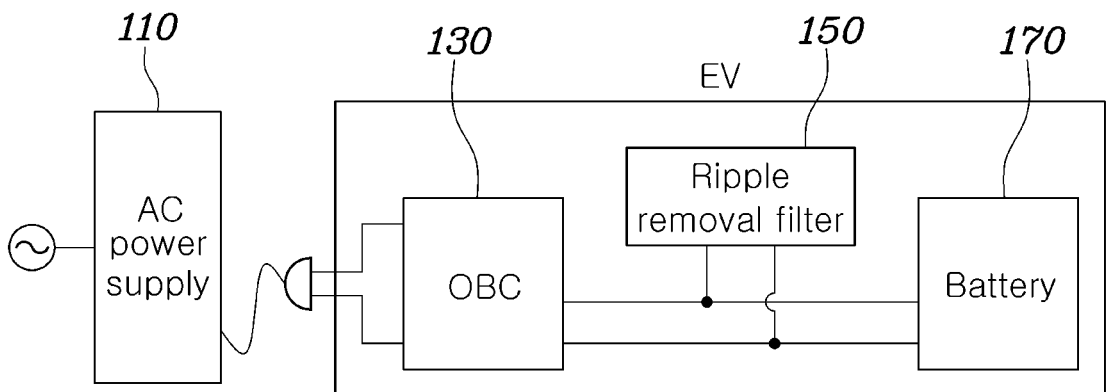
FIGS. 1A and 1B each show a power filtering system according to embodiments of the present invention.

Hereinafter, embodiments disclosed in the present specification will be described in detail with reference to the accompanying drawings, but the same or similar elements are assigned with the same reference numbers regardless of reference numerals of drawings, and redundant descriptions thereof will be omitted. Suffixes "module" and "part" for elements used in the following description are given or mixed in consideration of only ease of writing the specification and do not have distinct meanings or roles by themselves. In addition, in describing the embodiments disclosed in the present specification, when it is determined that detailed descriptions of related known technologies may obfuscate the gist of the embodiments disclosed in the present specification, the detailed description thereof will be omitted. In addition, the accompanying drawings are only for easy understanding of the embodiments disclosed in the present specification, and the technical idea disclosed herein is not limited by the accompanying drawings. In addition, the accompanying drawings should be understood to include all changes and equivalents or substitutes included in the spirit and scope of the present invention.

Terms including an ordinal number, such as first, second, and the like may be used to describe various elements, but the elements are not limited by the terms. The above terms are used only for the purpose of distinguishing one element from another element.

When an element is referred to as being "coupled" or "connected" to another element, it may be directly coupled or connected to another element, but it should be understood that other elements may exist in between. On the other hand, when it is described that a certain element is "directly coupled" or "directly connected" to another element, it should be understood that no other element is present in the middle.

A singular expression includes a plural expression unless the context clearly dictates otherwise.

In the present specification, terms such as "comprise" or "have" are intended to designate that the features, numbers, steps, operations, elements, parts, or combinations thereof described in the specification exist, but it should be understood that this does not preclude the existence or addition of one or more other features, numbers, steps, operations, elements, parts, or combinations thereof.

Figure 1B:
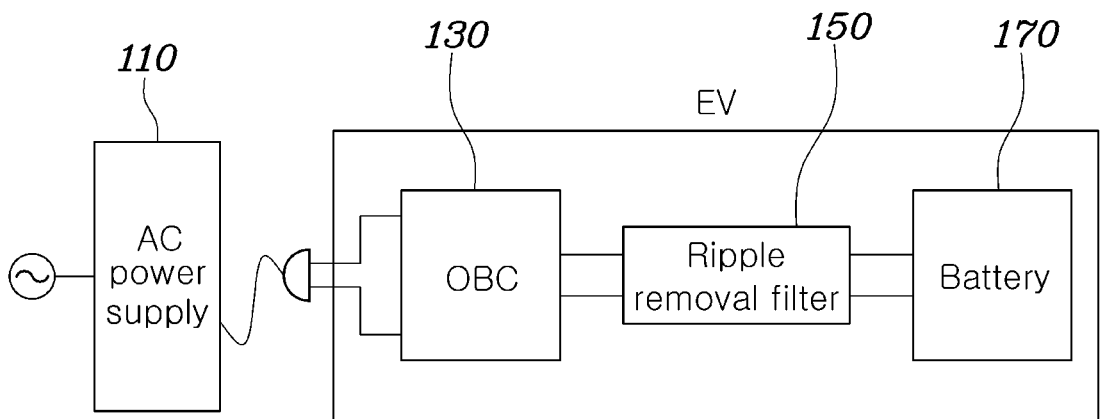

FIGS. 1A and 1B each show a power filtering system according to embodiments of the present invention.

FIG. 1A shows the power filtering system in which a ripple removal filter is connected in parallel between an on-board charger (OBC) and a battery, and FIG. 1B shows the power filtering system in which the ripple removal filter is connected in series between the on-board charger (OBC) and the battery.

With reference to FIGS. 1A and 1B, the power filtering system according to the present embodiments includes an AC power supply 110, the on-board charger (OBC) 130, a ripple removal filter 150, and a battery 170.

The AC power supply 110 is applied to the on-board charger (OBC) 130 in order to charge the battery 170. In this case, the AC power supply no may be a power supply installed in an external charging facility.

The on-board charger (OBC) 130 receives AC power from the AC power supply 110 and converts the same into DC power capable of charging the battery 170.

The ripple removal filter 150 is connected between the on-board charger 130 and the battery 170 to remove a ripple component of the DC power converted by the on-board charger 130 and provides the same to the battery 170. The ripple removal filter 150 may be connected in parallel with the on-board charger 130 as shown in FIG. 1A or may be connected in series between the on-board charger 130 and the battery 170 as shown in FIG. 1B.

In this case, the ripple removal filter 150 may be configured using other power conversion devices included in the vehicle except for the on-board charger 130 among devices inside a vehicle.

The battery 170 is charged by the DC power from which the ripple component is removed through the ripple removal filter 150.

Figure 2A:
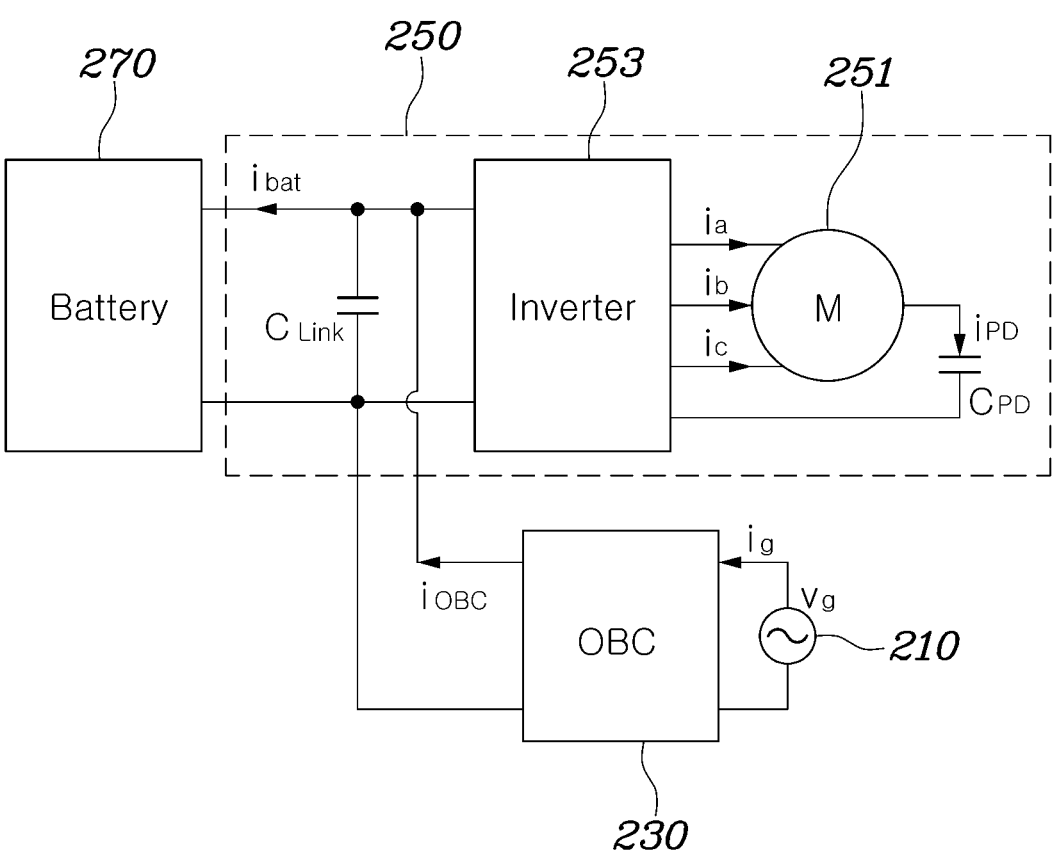
FIGS. 2A and 2B show embodiments in each of which a ripple removal filter is connected between a battery and an on-board charger (OBC) corresponding to one of the power filtering systems of FIGS. 1A and 1B.
Figure 2B:
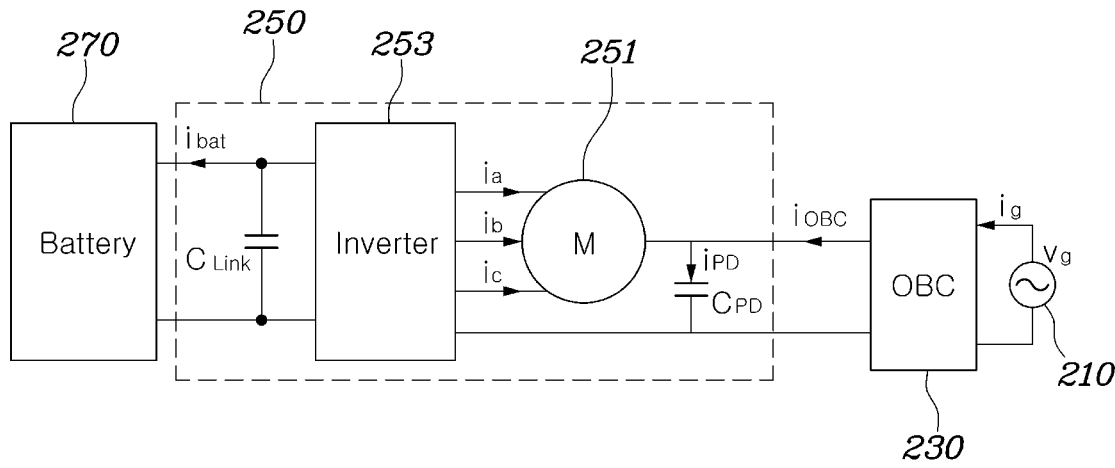

FIGS. 2A and 2B show embodiments in each of which a ripple removal filter is connected between a battery and an on-board charger (OBC) corresponding to one of the power filtering systems of FIGS. 1A and 1B.

With reference to FIGS. 2A and 2B, a motor 251, an inverter 253, and two capacitors $C_{PD}$ and $C_{Link}$ included in a vehicle may be used as a ripple removal filter 250, and such a ripple removal filter 250 may be connected in parallel with an on-board charger (OBC) 230 as shown in FIG. 2A or may also be connected in series between a battery 270 and the on-board charger 230 as shown in FIG. 2B.

Figure 3A:
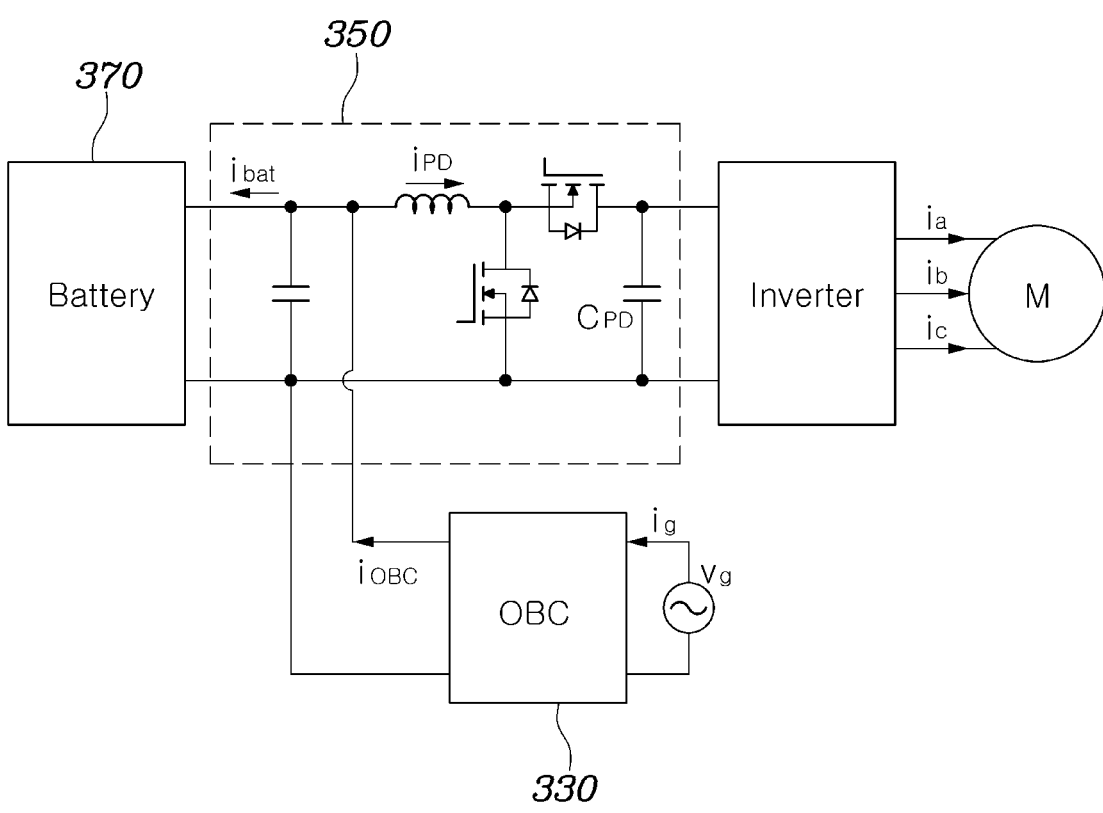
FIGS. 3A and 3B show other embodiments in each of which a ripple removal filter is connected between a battery and an on-board charger (OBC) corresponding to one of the power filtering systems of FIGS. 1A and 1B.
Figure 3B:
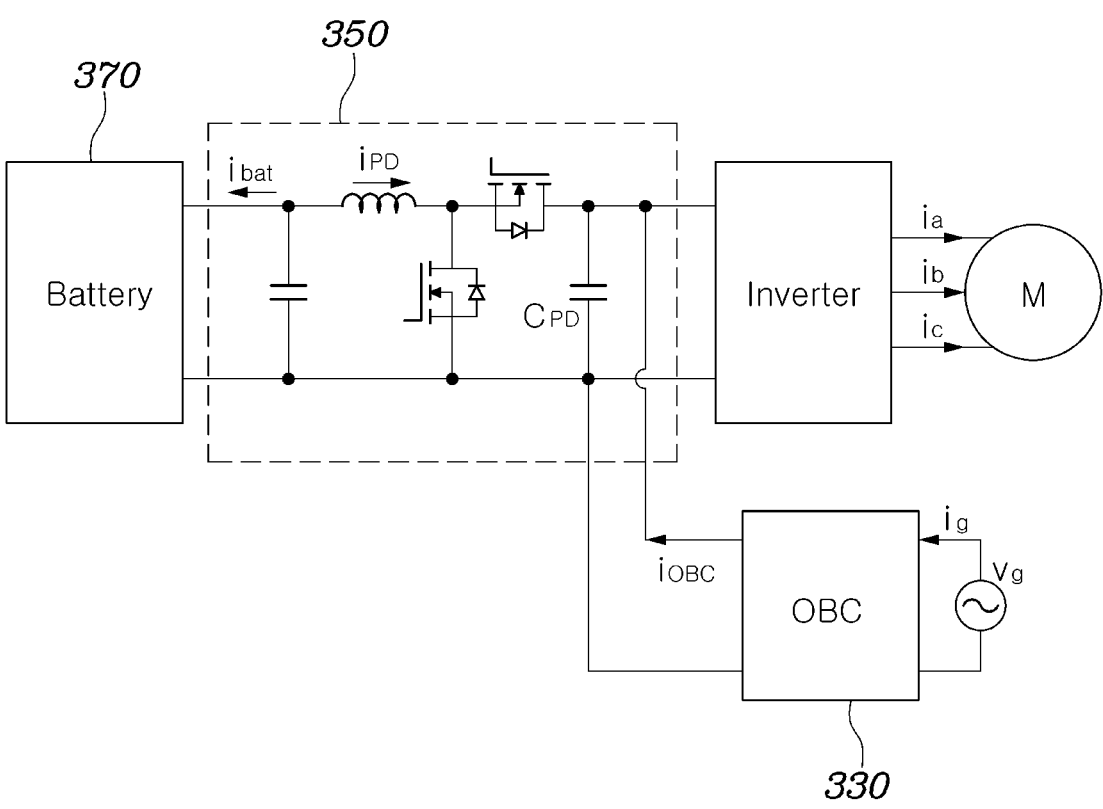

FIGS. 3A and 3B show other embodiments in each of which a ripple removal filter is connected between a battery and an on-board charger (OBC) corresponding to one of the power filtering systems of FIGS. 1A and 1B.

With reference to FIGS. 3A and 3B, a high voltage DC-DC converter included in a vehicle may be used as a ripple removal filter 350, and the ripple removal filter 350 may be connected in parallel with an on-board charger (OBC) 330 as shown FIG. 3A or may also be connected in series between a battery 370 and the OBC 330 as shown in FIG. 3B.

Figure 4A:
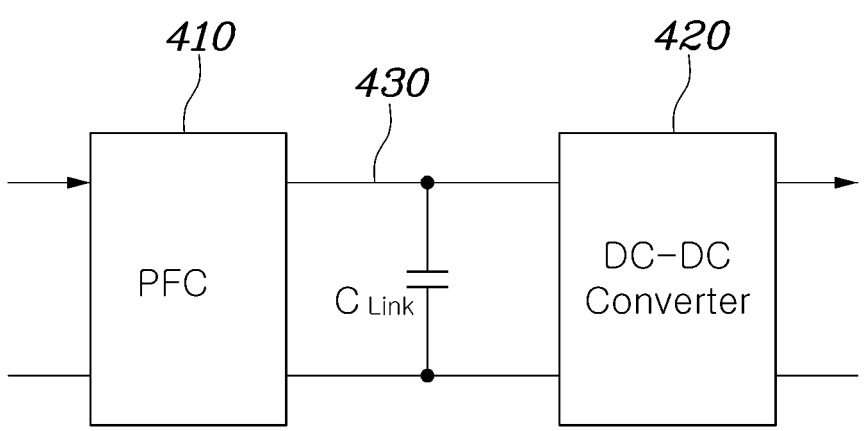
FIGS. 4A and 4B each show an on-board charger according to embodiments of the present invention.
Figure 4B:
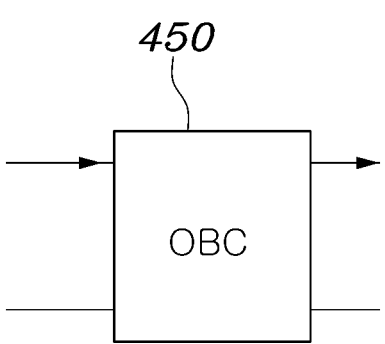

FIGS. 4A and 4B each show an on-board charger according to embodiments of the present invention.

FIG. 4A shows a two-stage structure of the on-board charger, and FIG. 4B shows a one-stage structure of the on-board charger.

With reference to FIG. 4A, the on-board charger having the two-stage structure includes a power factor correction (PFC) 410, a DC-DC converter 420, and a link capacitor 430 between the PFC 410 and the DC-DC converter 420.

The PFC 410 converts AC power into DC power and improves a power factor.

In addition, the DC-DC converter 420 may be an isolated DC-DC converter.

With reference to FIG. 4B, the on-board charger having the one-stage structure may include both functions of the PFC 410 and the DC-DC converter 420 in one on-board charger 450.

Figure 5A:
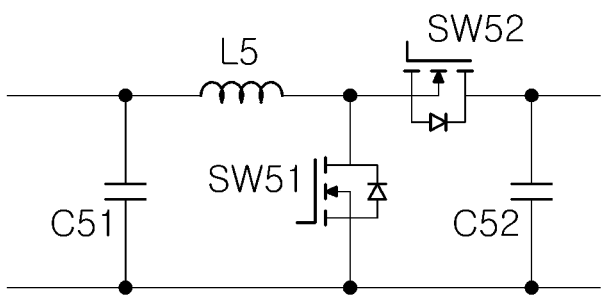
FIGS. 5A and 5B each show a ripple removal filter according to embodiments of the present invention.
Figure 5B:
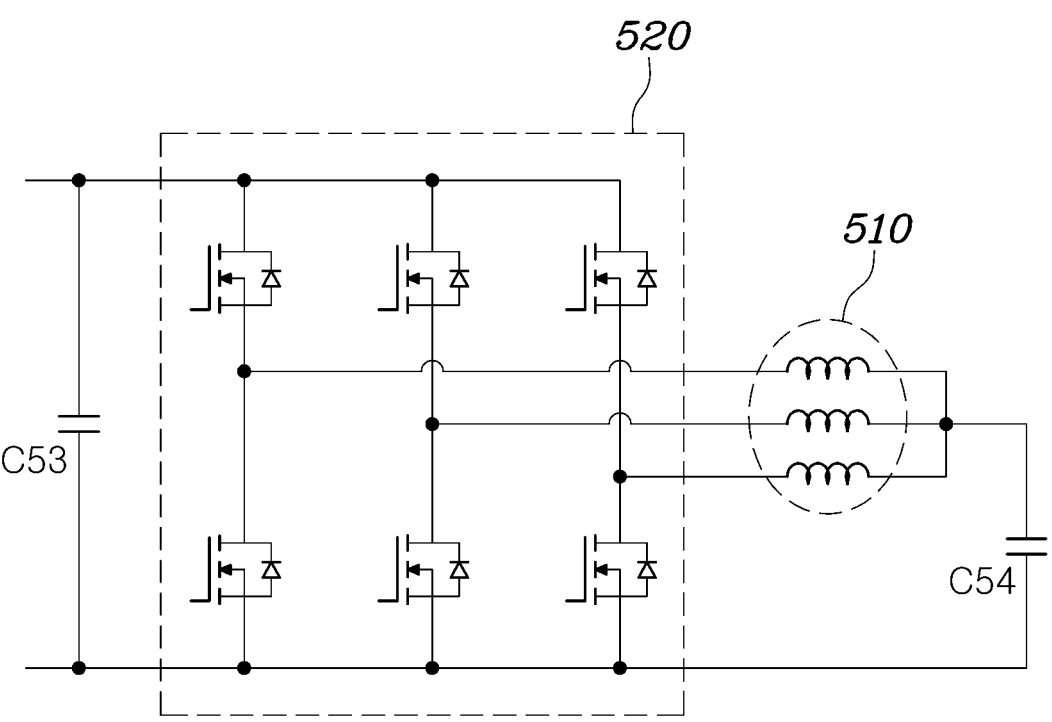

FIGS. 5A and 5B each show a ripple removal filter according to embodiments of the present invention.

FIG. 5A shows a structure of the ripple removal filter including the high voltage DC-DC converter included in a vehicle.

With reference to FIG. 5A, the ripple removal filter according to the present embodiment may be configured with a high voltage DC-DC converter (HDC) included in the vehicle and, for example, may include an inductor L5, two capacitors C51 and C52, and two first and second switches SW51 and SW52.

With reference to FIG. 5B, the ripple removal filter according to the present embodiment may include a motor 510, an inverter 520, and two capacitors C53 and C54 included in a vehicle.

With reference to FIGS. 5A and 5B, it may be seen that the ripple removal filter according to embodiments of the present invention may be configured in various embodiments using an active filter structure according to internal elements provided in an electric vehicle. In addition, the ripple removal filter may filter low-order harmonics even without simultaneously operating with the on-board charger when charging the battery.

Figure 6:
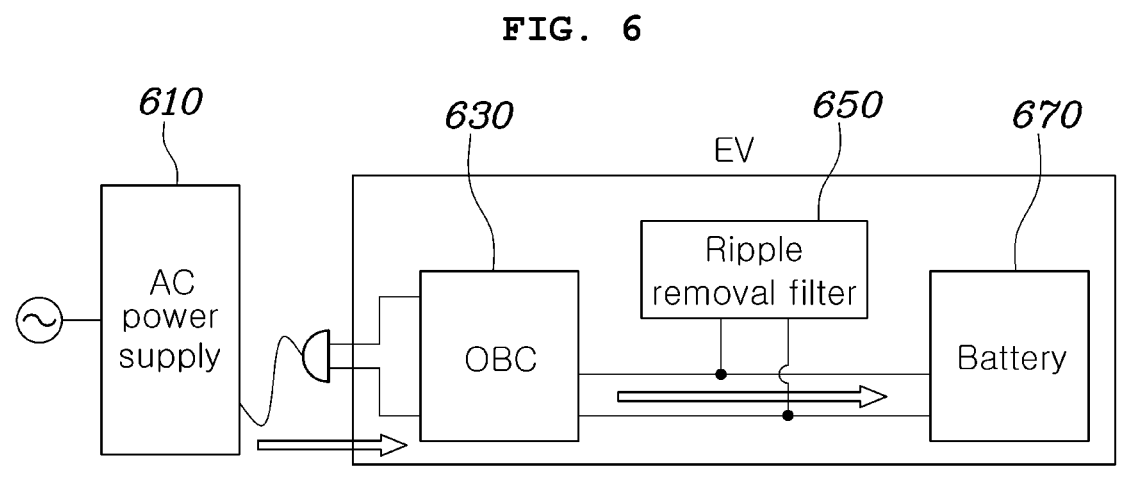

FIG. 6 shows a current flow in a filtering stop mode of a power filtering system according to an embodiment of the present invention.

With reference to FIG. 6, when a vehicle is charged using an AC power supply 610, the power supply may charge the battery 670 in a state in which low-order harmonics components of power are removed by a phase difference of each phase of the power while the power from the three-phase AC power supply passes through an on-board charger 630. When the low-order harmonics components are removed while such an external AC power passes through the on-board charger 630, the ripple removal filter 650 operates in the filtering stop mode that does not perform a separate filtering operation.

Figure 7A:
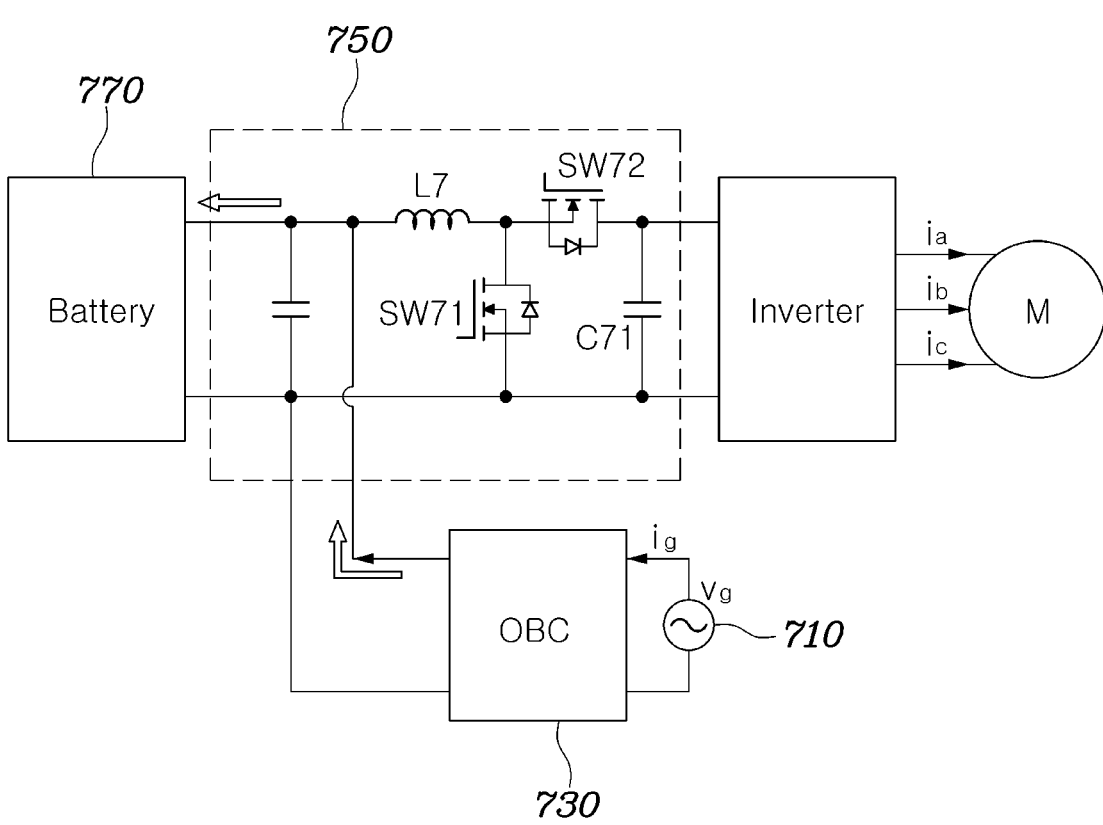
FIGS. 7A and 7B are each circuit diagrams illustrating a filtering stop mode of a power filtering system in which a high voltage DC-DC converter included in a vehicle is used as a ripple removal filter.
Figure 7B:
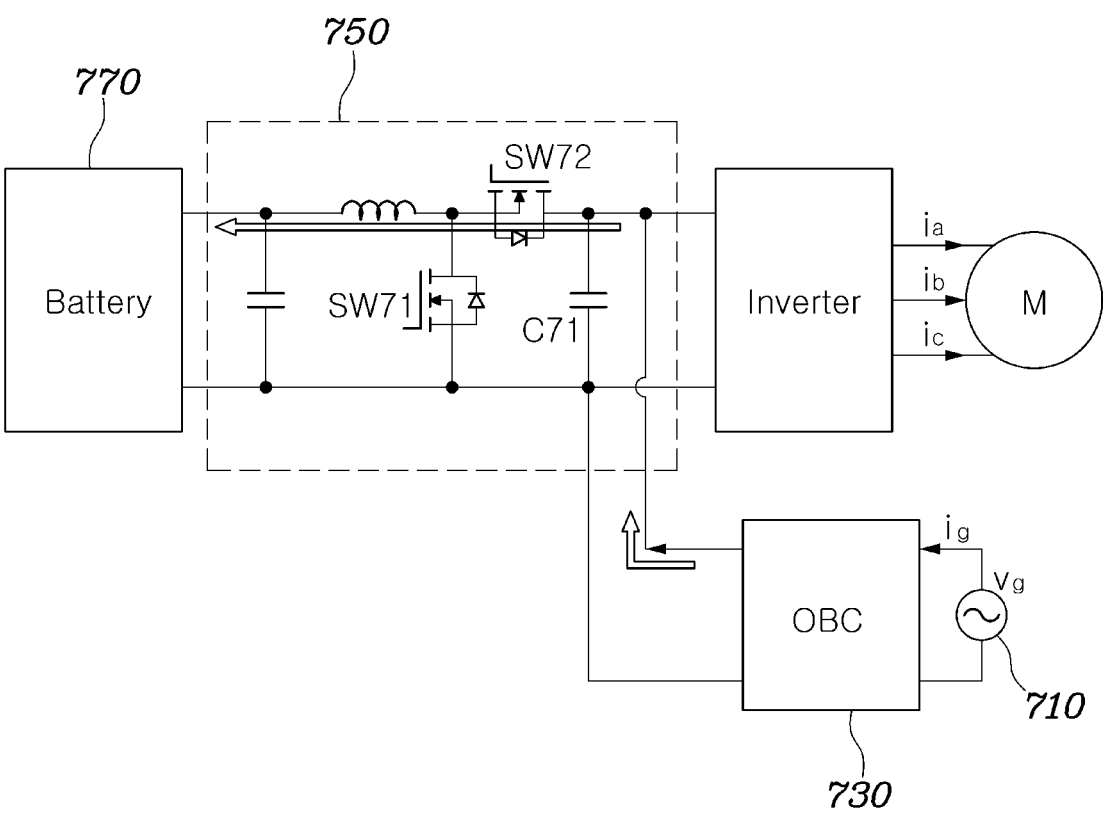

FIGS. 7A and 7B are each circuit diagrams illustrating a filtering stop mode of a power filtering system in which a high voltage DC-DC converter included in a vehicle is used as a ripple removal filter.

FIG. 7A shows a current flow in the filtering stop mode of the power filtering system including the ripple removal filter having a structure in which a high voltage DC-DC converter (HDC) included in a vehicle is connected in parallel with an on-board charger.

With reference to FIG. 7A, the ripple removal filter 750 includes first and second switches SW71 and SW72.

At this time, the power filtering system turns off both the first and second switches SW71 and SW72 of the ripple removal filter 750, thereby cutting off the current flow between the inductor L7 and the power storage capacitor C71. Accordingly, power from an AC power supply 710 passes through the on-board charger 730, is converted into DC power, and then directly charges a battery 770 without being subjected to an additional removal actuation of the low-order harmonics components.

FIG. 7B shows a current flow in the filtering stop mode of the power filtering system including the ripple removal filter of a structure in which the high voltage DC-DC converter (HDC) included in the vehicle is connected in series with the on-board charger.

With reference to FIG. 7B, the ripple removal filter 750 includes the first and second switches SW71 and SW72 likewise to the embodiment of FIG. 7A.

At this time, the power filtering system turns off the first switch SW71 and turns on the second switch SW72 in the ripple removal filter 750. Accordingly, the power from the AC power supply 710 passes through the on-board charger 730, is converted into DC power, then the high-frequency component is filtered, and charges the battery 770. The filtering stop mode may be performed while the switching loss is minimized through the removal of such harmonics components.

At this time, although not shown in FIGS. 7A and 7B, the power filtering system may further include a controller capable of controlling ON/OFF of the first and second switches SW71 and SW72.

Figure 8A:
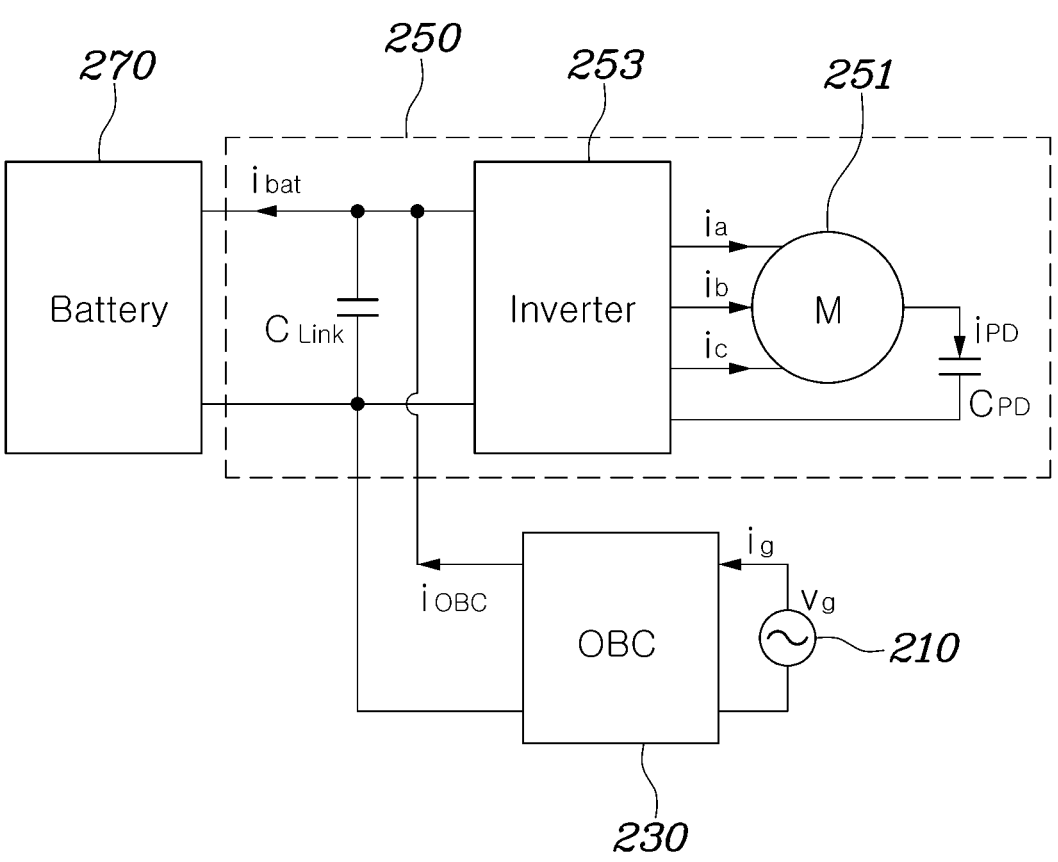
FIGS. 8A and 8B are each circuit diagrams illustrating a filtering stop mode of a power filtering system in which a motor, an inverter, and two capacitors included in a vehicle are used as a ripple removal filter.
Figure 8B:
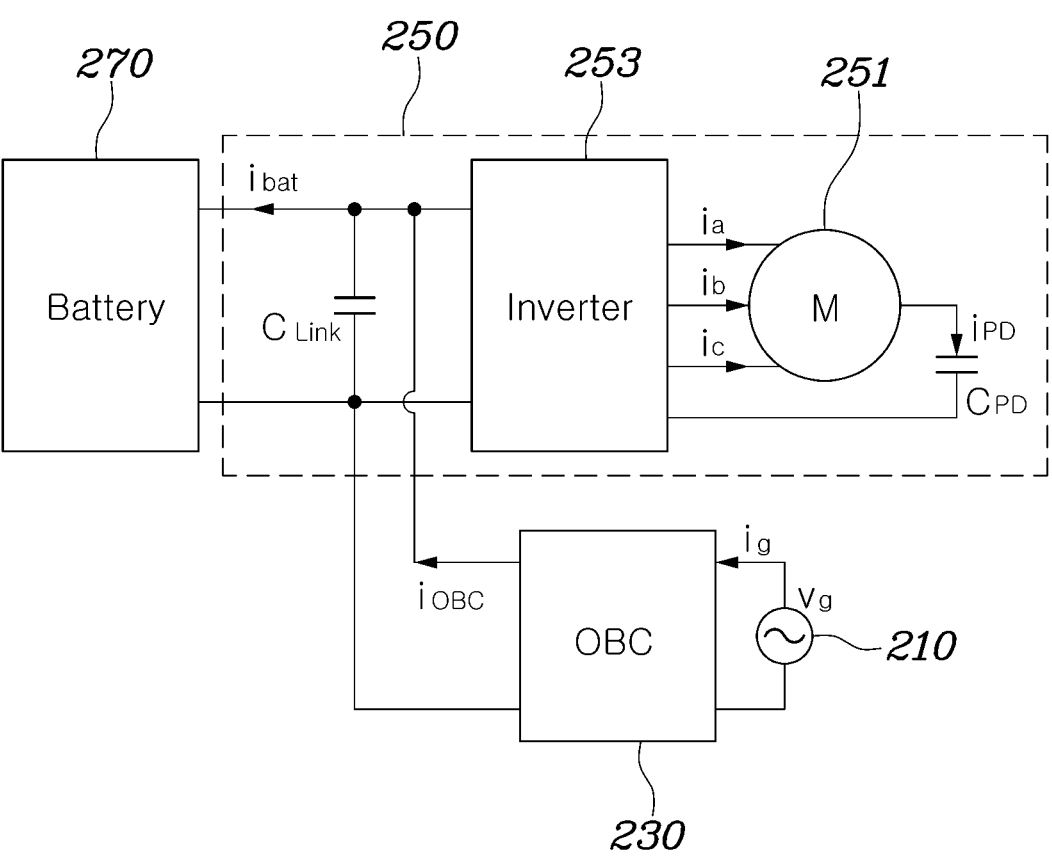

FIGS. 8A and 8B are each circuit diagrams illustrating a filtering stop mode of a power filtering system in which a motor, an inverter, and two capacitors $C_{Pd}$ and $C_{Link}$ included in a vehicle are used as a ripple removal filter.

FIG. 8A shows a current flow in the filtering stop mode of the power filtering system having a structure in which the ripple removal filter including the motor, the inverter, and two capacitors is connected in parallel with an on-board charger.

With reference to FIG. 8A, the ripple removal filter 850 includes first to sixth switches SW81, SW82, SW83, SW84, SW85, and SW86.

At this time, the power filtering system turns off all of the first to sixth switches SW81, SW82, SW83, SW84, SW85, and SW86 of the ripple removal filter 850, thereby preventing the current from flowing to an inverter side. Accordingly, power from the AC power supply 810 passes through the on-board charger 830, is converted into DC power, and then directly charges a battery 870 without being subjected to an additional removal actuation of the low-order harmonics components.

FIG. 8B shows a current flow in the filtering stop mode of the power filtering system having a structure in which the ripple removal filter including a motor, an inverter, and two capacitors is connected in series with the on-board charger.

With reference to FIG. 8B, the ripple removal filter 850 includes first to sixth switches SW81, SW82, SW83, SW84, SW85, and SW86 likewise to the embodiment of FIG. 8A.

At this time, the power filtering system turns on the first to third switches SW81, SW82, and SW83, and turns off the fourth to sixth switches SW84, SW85, and SW86, in the ripple removal filter 850. Accordingly, the power from the AC power supply 810 passes through the on-board charger 830, is converted into DC power, and then charges the battery 870.

At this time, although not shown in FIGS. 8A and 8B, the power filtering system may further include a controller capable of controlling ON/OFF of the first to sixth switches SW81, SW82, SW83, SW84, SW85, and SW86.

Hereinafter, a filtering initial charging mode of a power filtering system according to various embodiments of the present invention will be described.

When charging the battery using AC power, low-order harmonics such as 2nd harmonic or 6th harmonic may occur depending on the circuit configuration and control method of the OBC. In this case, the low-order harmonics as described above may be removed by the operation of the power filtering system according to embodiments of the present invention.

Meanwhile, the power filtering system according to embodiments of the present invention may remove low-order harmonics by the filtering mode, but when a voltage difference between the battery and the power storage capacitor to store the low-order harmonics is large, a voltage or current surge may occur. Therefore, in order to prevent such a surge, by increasing the voltage of the power storage capacitor before performing the filtering mode, the voltage difference with the battery is reduced so that a voltage or current surge phenomenon may be prevented when performing the filtering mode.

However, when the on-board charger performs an initial operation in a structure in which the ripple removal filter and the on-board charger are connected in series as shown in FIG. 1B, or when the power filtering system is switched from the filtering stop mode described in FIGS. 6 to 8 to a filtering mode to be described later, power may be charged to the power storage capacitor.

Accordingly, in the power filtering system having such a structure, the voltage or current surge phenomenon may be minimized even though the filtering initial charging mode is not separately performed.

However, in a structure in which the ripple removal filter and the on-board charger are connected in parallel, the filtering initial charging mode as follows may be performed in order to minimize the voltage or current surge phenomenon when the filtering mode is performed.

Figure 9:
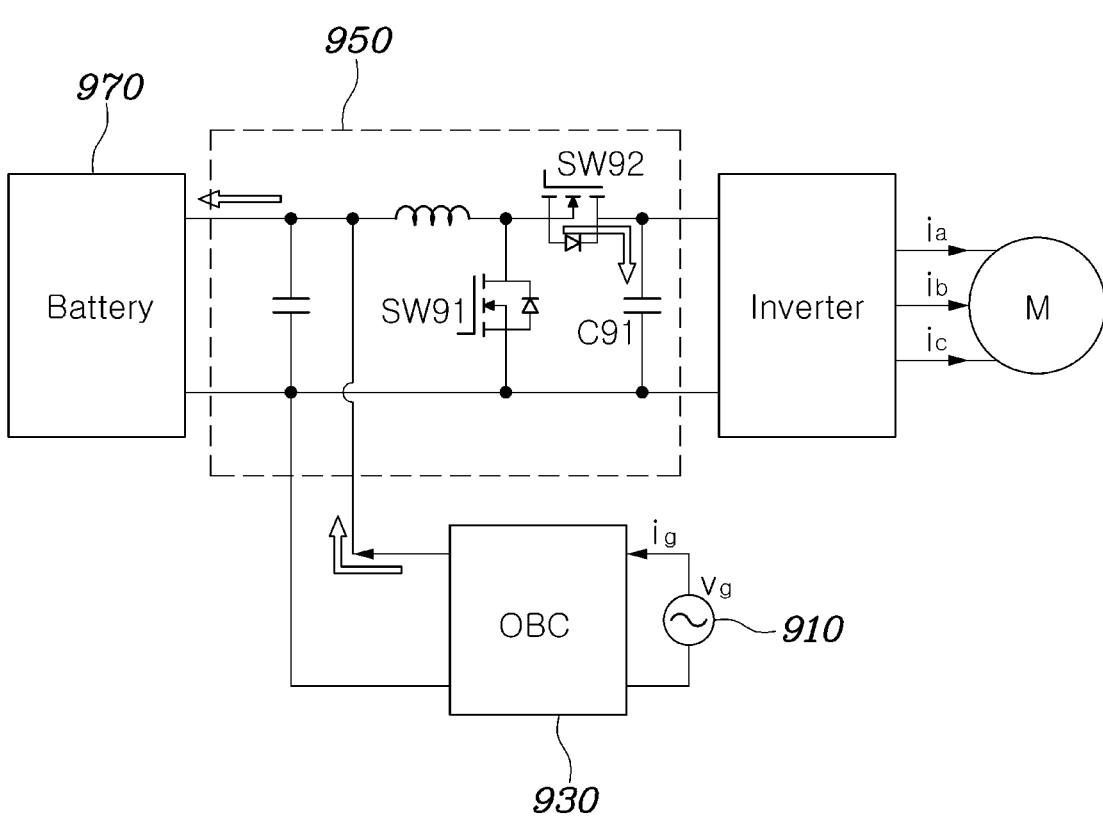
FIG. 9 is a circuit diagram illustrating a filtering initial charging mode of a power filtering system according to an embodiment of the present invention.

FIG. 9 is a circuit diagram illustrating a filtering initial charging mode of a power filtering system according to an embodiment of the present invention.

Specifically, FIG. 9 shows a current flow in the filtering initial charging mode of a power filtering system including a ripple removal filter having a structure in which a high voltage DC-DC converter (HDC) included in a vehicle is connected in parallel with an on-board charger.

With reference to FIG. 9, the ripple removal filter 950 includes first and second switches SW91 and SW92.

At this time, the power filtering system turns off the first switch SW91 and turns on the second switch SW92, in the ripple removal filter 950, thereby charging power to the capacitor C91 for power storage. Accordingly, a voltage difference between the power storage capacitor C91 and the battery 970 is reduced to minimize a voltage or current surge phenomenon.

Figure 10:
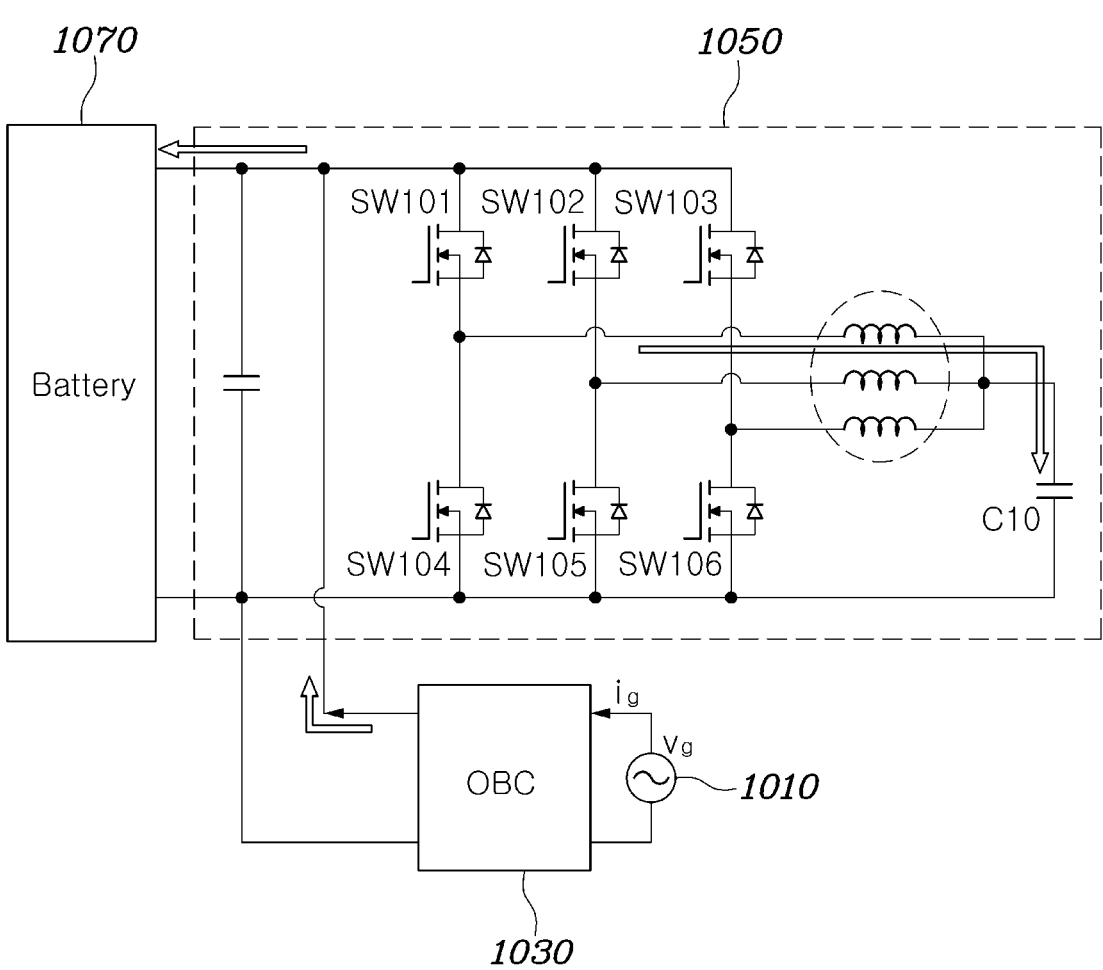
FIG. 10 is a circuit diagram illustrating a filtering initial charging mode of a power filtering system according to another embodiment of the present invention.

FIG. 10 is a circuit diagram illustrating a filtering initial charging mode of a power filtering system according to another embodiment of the present invention.

Specifically, FIG. 10 shows a current flow in a filtering initial charging mode of a power filtering system including a ripple removal filter having a structure in which a motor, an inverter, and two capacitors included in a vehicle are connected in parallel with an on-board charger.

With reference to FIG. 10, the ripple removal filter 1050 includes first to sixth switches SW101, SW102, SW103, SW104, SW105, and SW106.

At this time, the power filtering system turns on the first to third switches SW101, SW102, and SW103 and turns off the fourth to sixth switches SW104, SW105, and SW106, in the ripple removal filter 1050, thereby charging power to the capacitor C10 for power storage. Accordingly, a voltage difference between the power storage capacitor C10 and the battery 1070 is reduced to minimize a voltage or current surge phenomenon.

Figure 11:
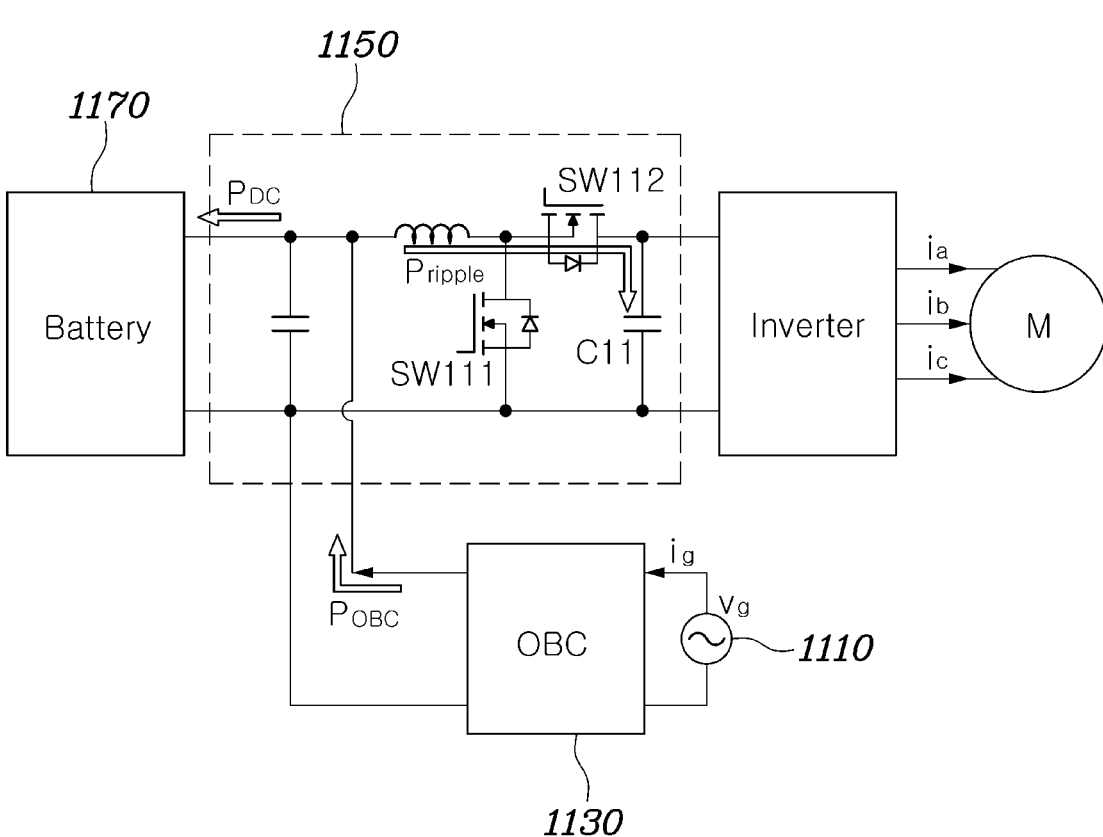
FIG. 11 is a circuit diagram illustrating a filtering mode of a power filtering system according to an embodiment of the present invention.

FIG. 11 is a circuit diagram illustrating a filtering mode of a power filtering system according to an embodiment of the present invention.

Specifically, FIG. 11 shows a current flow in the filtering mode of a power filtering system including a ripple removal filter having a structure in which a high voltage DC-DC converter (HDC) included in a vehicle is connected in parallel with an on-board charger.

With reference to FIG. 11, power $P_{OBC}$ generated from the on-board charger 1130 includes a component of a ripple power $P_{ripple}$ and a component of a main power $P_{DC}$ that is to be transmitted to the battery 1170. In this case, the component of the ripple power $P_{ripple}$ includes remaining components that do not contribute to the main power $P_{DC}$, such as low-order harmonics and switching frequency. Accordingly, such a ripple power component may be removed through switching of the first and second switches SW111 and SW112 in the filtering mode.

Figure 12:
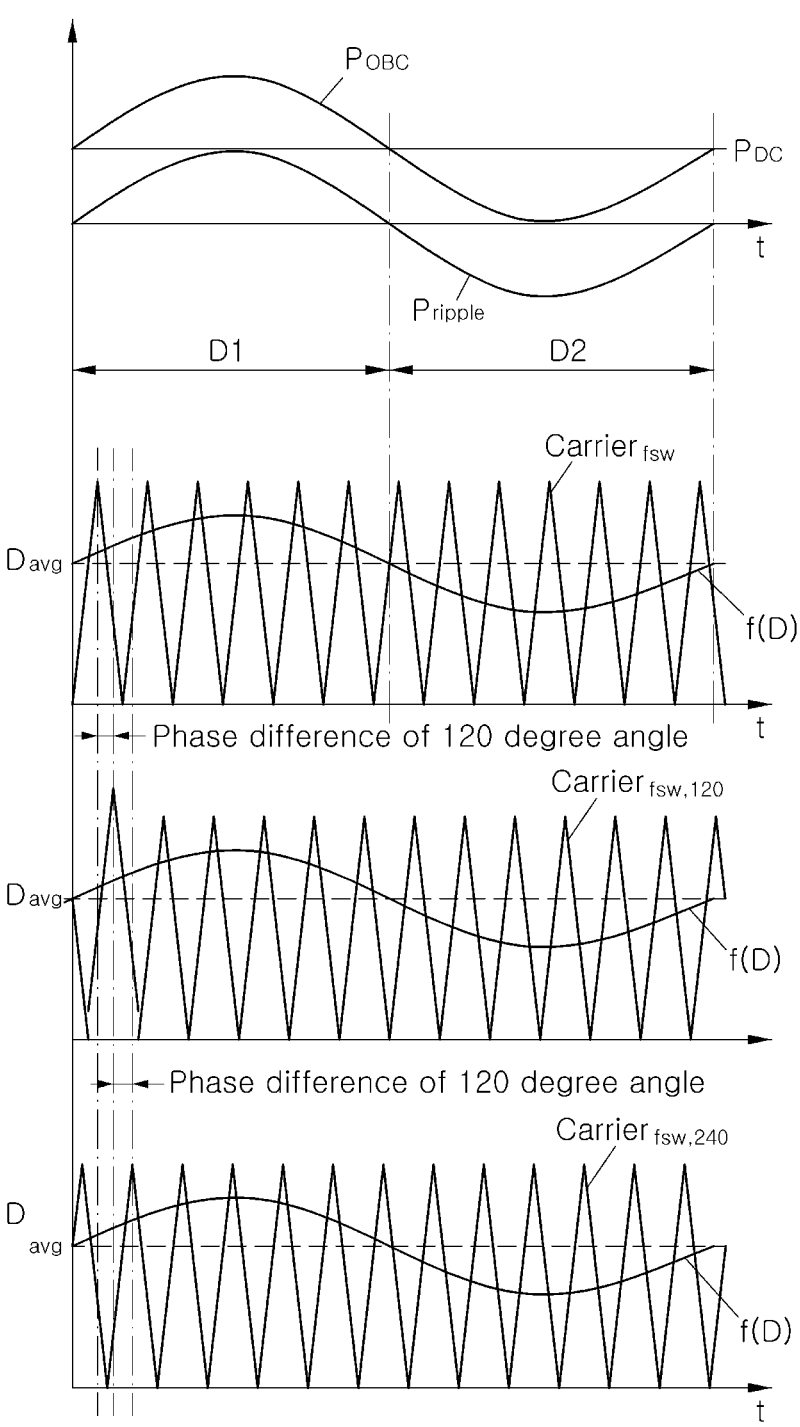
FIG. 12 shows waveforms of a duty signal for generating a switching signal, and a switching carrier signal in the filtering mode according to an embodiment of the present invention.

FIG. 12 shows waveforms of a duty signal for generating a switching signal, and a switching carrier signal in the filtering mode according to an embodiment of the present invention.

With reference to FIG. 11 together with a graph at top of FIG. 12, the power $P_{OBC}$ generated from the on-board charger 1130 includes the ripple power $P_{ripple}$ that is to be removed.

In this case, the ripple power $P_{ripple}$ may have a positive value in a D1 section and a negative value in a D2 section. That is, the output power $PO_{BC}$ generated from the on-board charger 1130 may be greater than the main power $P_{DC}$ required for charging the battery in the D1 section and may be smaller than the main power $P_{DC}$ required for charging the battery in the D2 section.

In this case, the power filtering system may, in the D1 section, turn off the first switch SW111 and turn on the second switch SW112 in order that some power may charge a harmonic storage capacitor.

In addition, on the contrary, in a section in which the output power of the on-board charger 1130 is smaller than the main power $P_{DC}$, the first switch SW111 is turned ON and the second switch SW112 is turned OFF in order that power having been charged in the harmonic storage capacitor C11 and the output power of the on-board charger 1130 may charge the main battery 1170 together.

Meanwhile, there may be a difference between the output power $P_{OBC}$ of the on-board charger 1130 and the target power required for charging the battery 1170, and therefore there may be a section in which the difference is large, and there may be a section in which the difference is small.

At this time, in the ripple removal filter 1150, the harmonic storage capacitor C11 is charged by maintaining a state in which the first switch SW111 is turned OFF,\ and the second switch SW112 is turned ON for a predetermined time, and on the contrary, the harmonic storage capacitor C11 is discharged by maintaining a state in which the first switch SW111 is turned ON and the second switch SW112 is turned OFF for a predetermined time. Accordingly, a switching operation for charging and discharging the harmonic storage capacitor C11 is repeatedly performed, whereby the ripple power may be removed.

For example, in a section in which the output power of the ripple removal filter 1150 and the target power are the same, a period of charging the harmonic storage capacitor C11 and a period of discharging the harmonic storage capacitor C11 are maintained to be the same, whereby the output power of the ripple removal filter 1150 may be transferred directly to the battery.

On the other hand, in a section in which the output power of the ripple removal filter 1150 is higher than the target power, switching is performed by taking a period during which the first switch SW111 is OFF and the second switch SW112 is ON to be longer compared with a period during which the first switch SW111 is ON and the second switch SW112 is OFF, whereby the output power of the ripple removal filter may come down.

In this case, the output power may be precisely adjusted close to the target power by precisely adjusting the period according to a difference value between the output power and the target power.

Conversely, in a section in which the output power of the ripple removal filter 1150 is lower than the target power, switching is performed by taking a period during which the first switch SW111 is OFF and the second switch SW112 is ON to be shorter compared with a period during which the first switch SW111 is ON and the second switch SW112 is OFF, whereby the output power of the ripple removal filter may rise up.

Likewise, in this case, the output power may be precisely adjusted close to the target power by precisely adjusting the period according to a difference value between the output power and the target power.

With reference to a second graph of FIG. 12, for example, when the voltage or current output through the ripple removal filter 1150 is provided in a waveform such as f(D), in a section where f(D) is higher compared with a carrier $_{fsw}$, which is a triangular wave signal for switching control, the first switch SW111 may be turned OFF and the second switch SW112 may be turned ON, and conversely, in a section where the f(D) may be lower compared with the carrier $_{fsw}$, the first switch SW111 may be turned ON and the second switch SW112 may be turned OFF. Therefore, switching is performed so that the power storage capacitor C11 is charged in the D1 section where the f(D) is higher compared with the $D_{avg}$, and the harmonic storage capacitor C11 is discharged in the D2 section where the f(D) is lower compared with the $D_{avg}$.

Figure 13A:
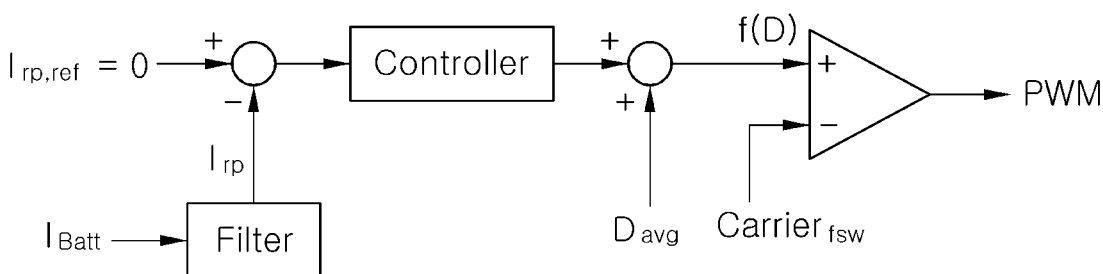
FIGS. 13A and 13B are each control diagrams for controlling a switch of a filter in the filtering mode according to an embodiment of the present invention.
Figure 13B:
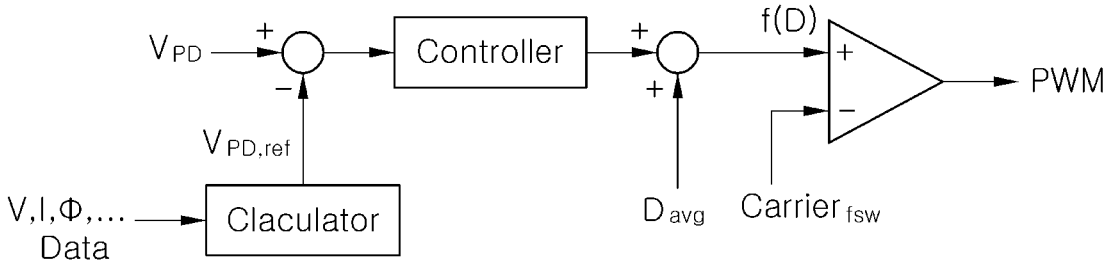

FIGS. 13A and 13B are each control diagrams for controlling a switch of a filter in the filtering mode according to embodiments of the present invention. FIG. 13A is a control diagram for performing control based on a current value of a battery, and FIG. 13B is a control diagram for performing control based on a voltage value of a harmonic storage capacitor.

In FIG. 13A, $I_{Batt}$ represents a current value measured in the battery and $I_{rp,ref}$ represents a reference ripple current value. In addition, $D_{avg}$ represents an average value of a duty signal of the desired output. In this case, the $D_{avg}$ may be determined by a user input.

On the other hand, since the value of the ripple current is zero in an ideal filter, $I_{rp,ref}$ may have a value of zero. Meanwhile, the f(D) signal may be derived by the sum of an output signal and the $D_{avg}$ signal, wherein the output signal is output using a difference value between an $I_{rp}$ signal and $I_{p,ref}$ as the controller input signal, wherein the $I_{rp}$ signal is output using $I_{Batt}$ as the filter input signal. For example, the f(D) signal and the carrier$_{fsw}$, which is a triangular wave signal for switching control, may be signals such as the waveforms of the second graph of FIG. 12, respectively. The controller may perform switching control for the first and second switches SW111 and SW112 by comparing the f(D) signal with the carrier$_{fsw}$.

In addition, in FIG. 13B, $V_{PD}$ represents a voltage value measured in the harmonic storage capacitor, and $V_{PD,ref}$ represents a reference voltage value of the harmonic storage capacitor. In this case, the reference voltage value $V_{PD,ref}$ of the harmonic storage capacitor may be determined on the basis of a data value input to a calculator by a user. In addition, $D_{avg}$ represents the average value of the duty signal of the desired output. In this case, the $D_{avg}$ may be determined by the user input.

Meanwhile, the f(D) signal may be derived by the sum of an output signal and the $D_{avg}$ signal, wherein the output signal is output by using the difference between the $V_{PD}$ and $V_{PD,ref}$ as an input signal to the controller. The f(D) signal and the carrier$_{fsw}$, which is a triangular wave signal for switching control, are compared with each other, whereby the switching control for the first and second switches SW111 and SW112 may be performed FIG. 14 is a circuit diagram illustrating a filtering mode of a power filtering system according to another embodiment of the present invention.

Figure 14:
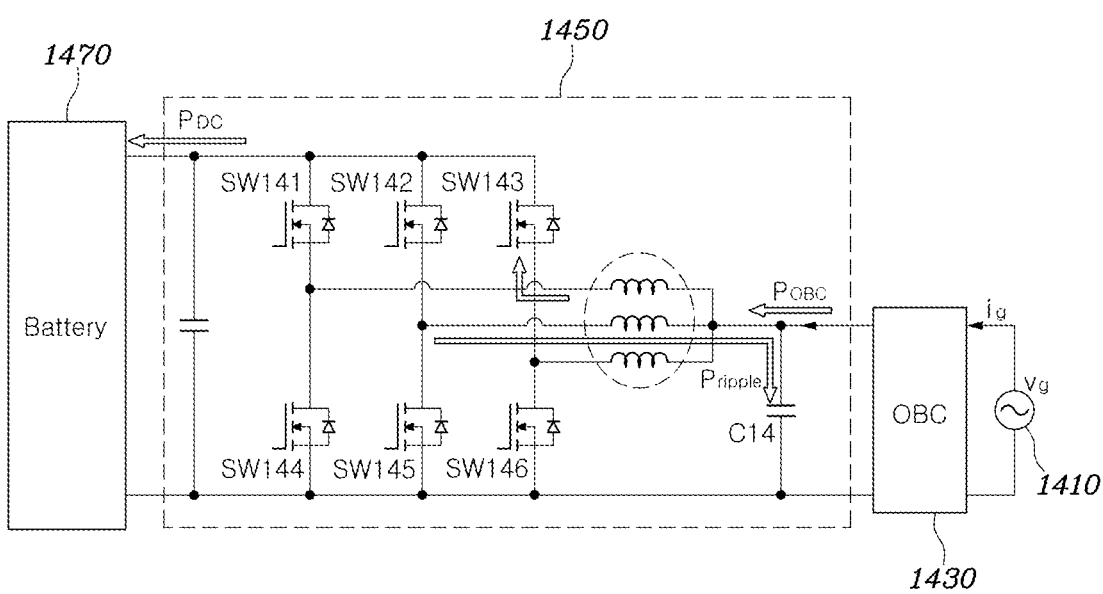
FIG. 14 is a circuit diagram illustrating a filtering mode of a power filtering system according to another embodiment of the present invention.

Specifically, FIG. 14 shows a current flow in the filtering mode of a power filtering system in which a motor, an inverter, and two capacitors included in a vehicle are used as a ripple removal filter.

With reference to FIG. 14, a power PO$_{BC}$ generated from an on-board charger 1430 includes a component of a ripple power P$_{ripple}$ and a component of a main power P$_{DC}$ that is to be transmitted to the battery. In this case, the component of the ripple power P$_{ripple}$ includes remaining components such as low-order harmonics and a switching frequency that do not contribute to the main power. Accordingly, such a ripple power component may be removed through switching of the first to sixth switches SW141, SW142, SW143, SW144, SW145, and SW146 in the filtering mode.

With reference to FIG. 14 together with a graph at the top of FIG. 12, the power PO$_{BC}$ generated from the on-board charger 1430 includes the ripple power P$_{ripple}$ that is to be removed.

In this case, the ripple power P$_{ripple}$ may have a positive value in a D1 section and a negative value in a D2 section. That is, the output power PO$_{BC}$ generated from the on-board charger 1430 may be greater than the main power P$_{DC}$ required for charging the battery in the D1 section and may be smaller than the main power P$_{DC}$ required for charging the battery in the D2 section.

In this case, the ripple power P$_{ripple}$ may have a positive value in a D1 section and a negative value in a D2 section. That is, the output power PO$_{BC}$ generated from the on-board charger 1430 may be greater than the main power P$_{DC}$ required for charging the battery in the D1 section and may be smaller than the main power P$_{DC}$ required for charging the battery in the D2 section.

In this case, the power filtering system may, in the D1 section, turn OFF the first to third switches SW141, SW142, and SW143 and turn ON the fourth to sixth switches SW144, SW145, and SW146 in order that some power may charge a harmonic storage capacitor C14.

In addition, on the contrary, in a section in which the output power of the on-board charger 1430 is smaller than the main power P$_{DC}$, the first to third switches SW141, SW142, and SW143 are turned ON, and the fourth to sixth switches SW144, SW145, and SW146 are turned OFF in order that the power in the harmonic storage capacitor C14 and the power of the on-board charger 1430 may charge the main battery 1470 together.

Meanwhile, there may be a difference between the output power P$_{OBC}$ of the on-board charger 1430 and the target power required for charging the battery 1470, and therefore there may be a section in which the difference is large, and there may be a section in which the difference is small.

At this time, in the ripple removal filter 1450, the harmonic storage capacitor C14 is charged by maintaining a state in which the first to third switches SW141, SW142, and SW143 are turned OFF and the fourth to sixth switches SW144, SW145, and SW146 are turned ON for a predetermined time, and on the contrary, the harmonic storage capacitor C14 is discharged by maintaining a state in which the first to third switches SW141, SW142, and SW143 are turned ON and the fourth to sixth switches SW144, SW145, and SW146 are turned OFF for a predetermined time. Accordingly, a switching operation for charging and discharging the harmonic storage capacitor C14 is repeatedly performed, whereby the ripple power may be removed.

For example, in a section in which the output power of the ripple removal filter 1450 and the target power are the same, a period of charging the harmonic storage capacitor C14 and a period of discharging the harmonic storage capacitor C14 are maintained to be the same, whereby the output power of the ripple removal filter 1450 may be transferred directly to the battery.

On the other hand, in a section in which the output power of the ripple removal filter 1450 is higher than the target power, switching is performed by taking a period during which the first to third switches SW141, SW142, and SW143 are OFF and the fourth to sixth switches SW144, SW145, and SW146 are ON to be longer compared with a period during which the first to third switches SW141, SW142, and SW143 are ON and the fourth to sixth switches SW144, SW145, and SW146 are OFF, whereby the output power of the ripple removal filter may come down.

In this case, the output power may be precisely adjusted close to the target power by precisely adjusting the period according to a difference value between the output power and the target power.

Conversely, in a section in which the output power of the ripple removal filter 1450 is lower than the target power, switching is performed by taking a period during which the first to third switches SW141, SW142, and SW143 are OFF and the fourth to sixth switches SW144, SW145, and SW146 are ON to be shorter compared with a period during which the first to third switches SW141, SW142, and SW143 are ON and the fourth to sixth switches SW144, SW145, and SW146 are OFF, whereby the output power of the ripple removal filter may rise up.

Likewise, in this case, the output power may be precisely adjusted close to the target power by precisely adjusting the period according to a difference value between the output power and the target power.

With reference to the second to fourth graphs of FIG. 12, carriers whose legs have a phase difference of 120-degrees one from another based on the switching frequency $f_{sw}$ by using the control method of the three-phase interleaved boost converter may be used for the first to sixth switches SW141, SW142, SW143, SW144, SW145, and SW146.

At this time, the waveforms in the second graph are comparison waveforms of f(D) and carrier$_{fsw}$ for switching each of the first switch SW141 and the fourth switch SW144, and the waveforms in the third graph are comparison waveforms of f(D) and carrier$_{fsw,120}$ for switching each of the second switch SW142 and the fifth switch SW145. In addition, the waveforms in the fourth graph are comparison waveforms of f(D) and carrier$_{fsw,240}$ for switching each of the third switch SW143 and the sixth switch SW146. At this time, the carrier$_{fsw}$, the carrier$_{fsw,120}$, and the carrier$_{fsw,240}$ each have the phase difference of 120-degrees from one another.

In addition, the control diagram illustrated in FIG. 13 may be applied to controls between the first and fourth switches SW141 and SW144, the second and fifth switches SW142 and SW145, and the third and sixth switches SW143 and SW146.

At this time, the controller may perform switching control for the first and fourth switches SW141 and SW144 by comparing the f(D) signal with the carrier$_{fsw}$ and may perform switching control for the second and fifth switches SW142 and SW145 by comparing the f(D) signal with Carrier$_{fsw,120}$. In addition, the controller may perform switching control for the third and sixth switches SW143 and SW146 by comparing the f(D) signal with the carrier$_{fsw,240}$.

Figure 15:
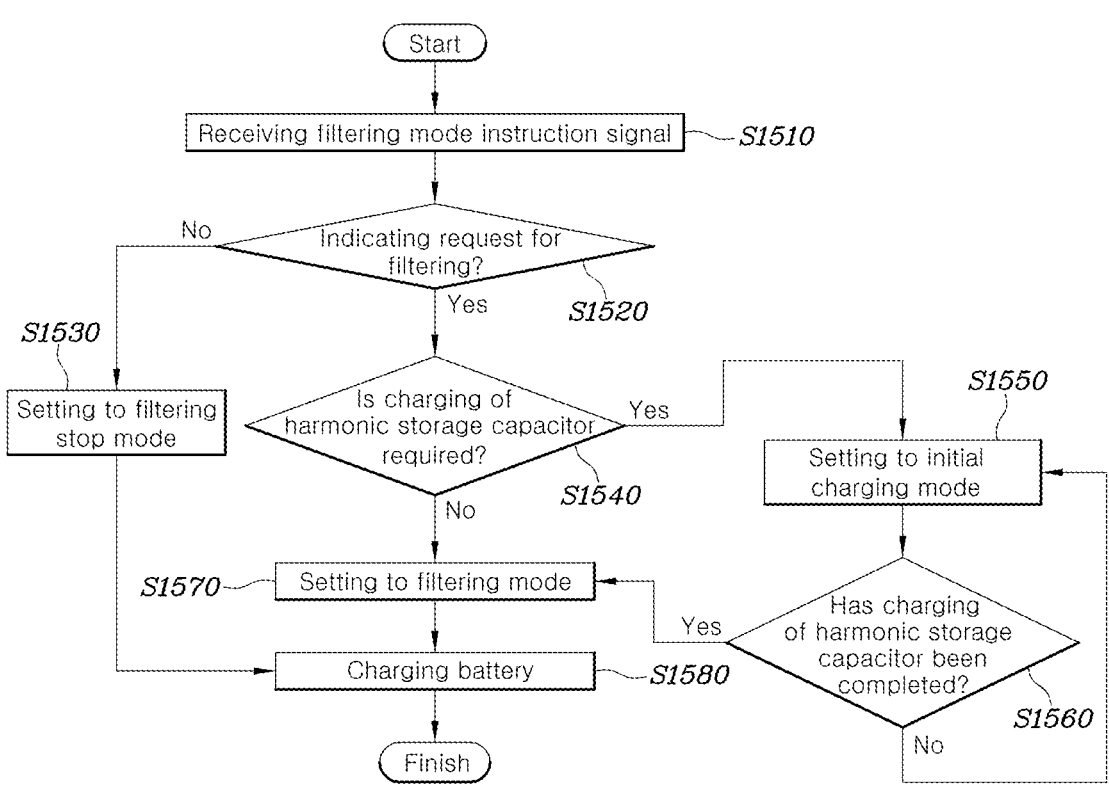
FIG. 15 is a flowchart illustrating a charging power filtering method according to an embodiment of the present invention.

FIG. 15 is a flowchart illustrating a charging power filtering method according to an embodiment of the present invention. The charging power filtering method of FIG. 15 may be performed by a controller in the power filtering system of embodiments of the present invention.

With reference to FIG. 15, the controller receives a filtering mode instruction signal from an on-board charger (OBC) in S1510.

In this case, the filtering mode instruction signal may indicate a request for power filtering or may indicate that power filtering is not required.

In this case, the filtering mode instruction signal may be generated by the on-board charger on the basis of a system state and a battery state.

In addition, the controller determines whether or not the filtering mode instruction signal indicates a request for filtering in S1520 and, when the filtering mode instruction signal does not indicate a request for filtering (No to S1520), sets a ripple removal filter to a filtering stop mode in S1530 to charge the battery in S1580.

At this time, the filtering stop mode may be set according to FIGS. 6 to 8 and descriptions associated therewith.

Meanwhile, as a result of the determination in S1520, when the filtering mode instruction signal indicates a request for filtering (Yes to S1520), the controller determines whether or not the initial charging of the harmonic storage capacitor is required in S1540 and, when the initial charging of the harmonic storage capacitor is required (Yes to S1540), sets the ripple removal filter to an initial charging mode in S1550.

In this case, whether or not the initial charging of the harmonic storage capacitor is required may be determined on the basis of a comparison result between the voltage of the harmonic storage capacitor and a preset first threshold value.

In this case, the first threshold value may be determined on the basis of the voltage of the battery.

In this case, the initial charging mode may be set according to FIGS. 9 and 10 and descriptions associated therewith.

In addition, the controller determines whether or not the initial charging of the harmonic storage capacitor has been completed in S156o, thereby, when the charging has not been completed (No to S1560), maintaining the ripple removal filter in the charging mode in S1550 and, when the charging has been completed (Yes in S1560), setting the ripple removal filter to the filtering mode in S1570.

At this time, the filtering mode may be set according to FIGS. 11 to 14 and descriptions associated therewith.

Meanwhile, when it is determined in step S1540 that the initial charging of the harmonic storage capacitor is not required (No in S1540), the controller sets the ripple removal filter to the filtering mode in S1570 and charges the battery in S1580.

FIGS. 16A to 16C and FIGS. 17A and 17B illustrate power filtering systems according to various embodiments of the present invention, respectively.

Figure 16A:
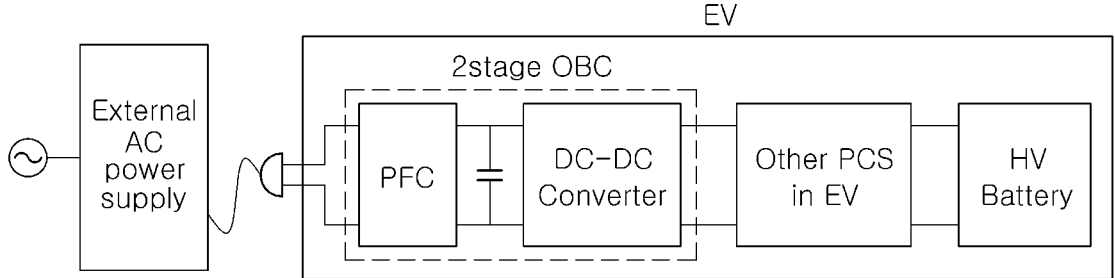
FIGS. 16A to 16C and FIGS. 17A and 17B illustrate power filtering systems according to various embodiments of the present invention, respectively.
Figure 16B:
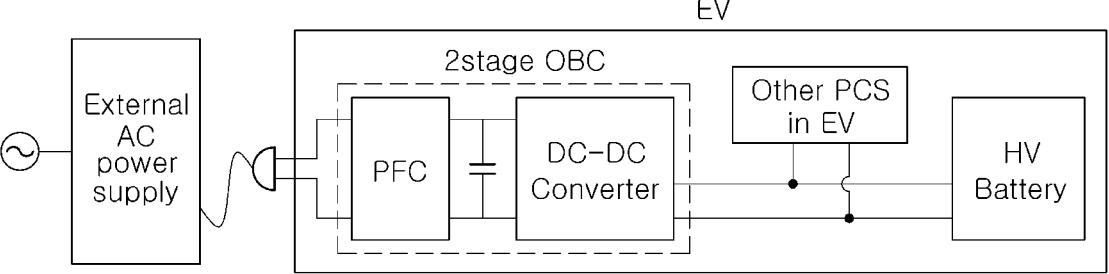
Figure 16C:
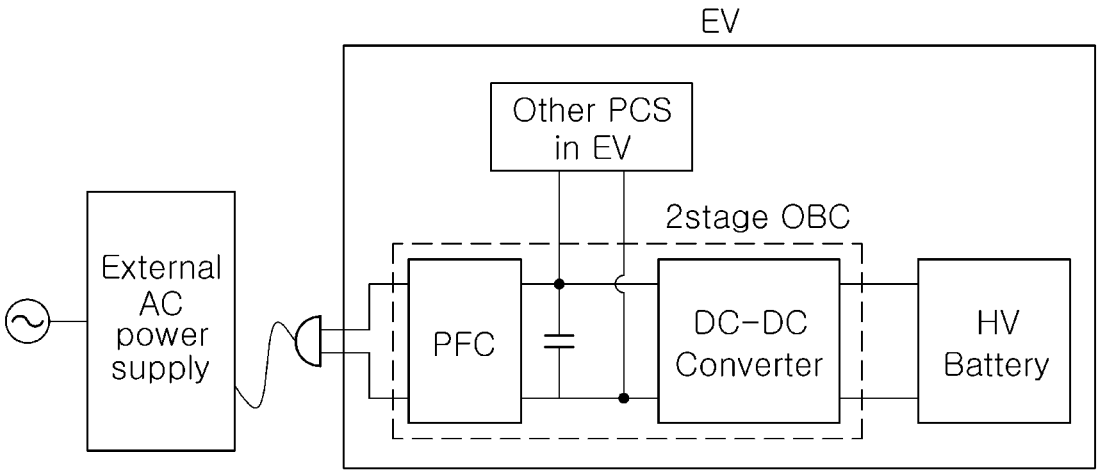
Figure 17A:
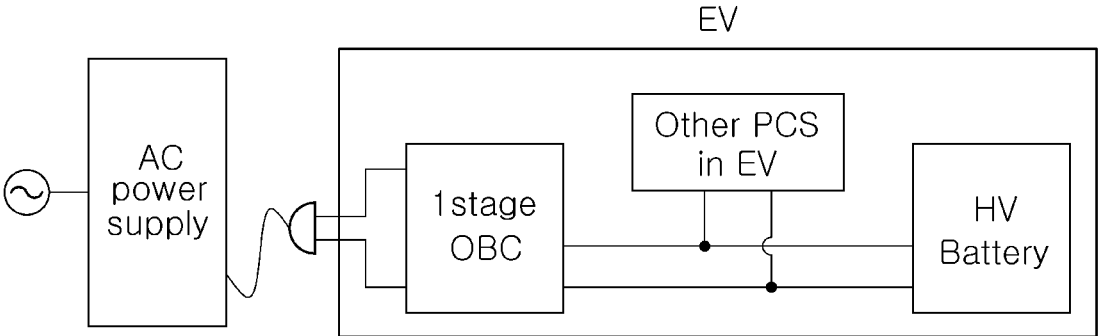
Figure 17B:
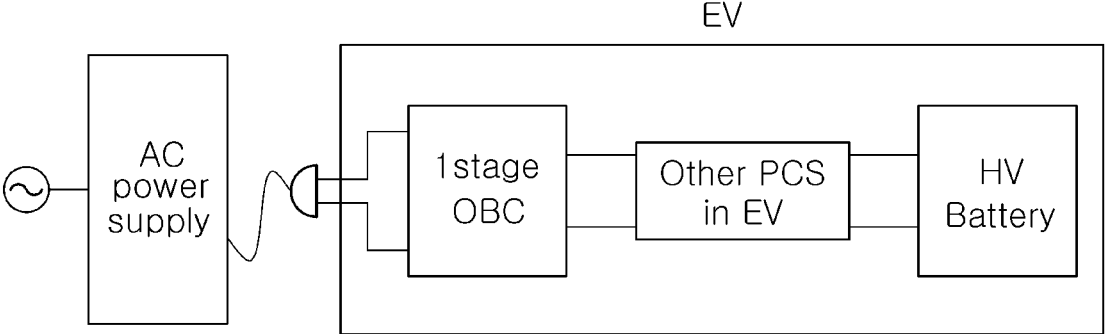

FIGS. 16A to 16C show embodiments of power filtering systems in which each of the on-board chargers has a two-stage structure, and FIGS. 17A and 17B show embodiments of power filtering systems in which each of the on-board chargers has a one-stage structure.

In addition, FIGS. 16A and 16B show embodiments in which other power conversion elements except for the on-board charger that may be used as a ripple removal filter in embodiments of the present invention are connected in series or in parallel between the DC-DC converter and the high voltage battery, and FIG. 16C shows an embodiment in which power conversion elements other than the on-board charger are connected between a power factor correction (PFC) and a battery in parallel with a DC-DC converter together.

Meanwhile, FIGS. 17A and 17B show embodiments in which power conversion elements other than the on-board charger are respectively connected in parallel or in series between the on-board charger having a one-stage structure and the battery.

With reference to FIGS. 16A to 16C and FIGS. 17A and 17B, it may be confirmed that the power filtering system according to embodiments of the present invention may be configured in various embodiments using an active filter structure, according to internal elements provided in an electric vehicle.

According to the present embodiments, the volume and cost of the power conversion device may be minimized by using the motor inverter or the high voltage converter, which is a circuit existing inside the vehicle, as an active filter, without introducing additional elements.

In addition, it is possible to remove the low-order harmonics without having the low-order harmonics removal filter simultaneously operated with the power conversion device.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A charging power filtering method, the method comprising:

receiving a signal instructing whether or not a filtering request is required from an on-board charger;

selecting a mode of a plurality of modes for driving a filter based on the signal instructing whether or not the filtering request is required, wherein the filter is connected in series or parallel to the on-board charger and wherein, when the filter is connected in series to the on-board charger, the plurality of modes comprises a filtering mode for removing a harmonic signal and a filtering stop mode for not removing the harmonic signal; and charging a battery using the selected mode.

2. The method of claim 1, wherein the filter comprises a high voltage DC-DC converter filter or a filter having a motor and an inverter coupled with each other therein.

3. The method of claim 1, wherein, when the filter is connected in parallel to the on-board charger, the plurality of modes comprises:

the filtering mode for removing the harmonic signal;

the filtering stop mode for not removing the harmonic signal; and an initial charging mode for performing initial charging to a harmonic storage capacitor.

4. The method of claim 3, wherein, by determining whether or not the initial charging of the harmonic storage capacitor is required, selecting the mode of the plurality of modes further comprises:

performing the initial charging mode when it is determined the initial charging is required; and switching to the filtering mode when it is determined the initial charging has been completed.

5. The method of claim 4, wherein whether or not the initial charging of the harmonic storage capacitor is required is determined based on a comparison result of a voltage of the harmonic storage capacitor and a first threshold value.

6. The method of claim 5, wherein the first threshold value is determined based on a voltage of the battery.

7. The method of claim 4, wherein whether or not the initial charging has been completed is determined based on a comparison result between a voltage of the harmonic storage capacitor and a second threshold value.

8. The method of claim 7, wherein the second threshold value is determined based on a voltage of the battery.

9. A charging power filtering device, the device comprising:

an AC power supply;

an on-board charger configured to convert input power from the AC power supply into DC power;

a filter configured to operate in a mode of a plurality of modes to remove a harmonic signal from the DC power, wherein the filter is connected in series or parallel to the on-board charger and wherein, when the filter is connected in series to the on-board charger, the plurality of modes comprises a filtering mode for removing the harmonic signal and a filtering stop mode for not removing the harmonic signal; and a battery configured to be charged by receiving power from which the harmonic signal is removed by the filter.

10. The device of claim 9, wherein the filter comprises a high voltage DC-DC converter filter or a filter having a motor and an inverter coupled with each other therein.

11. The device of claim 9, wherein, when the filter is connected in parallel to the on-board charger, the plurality of modes comprises:

the filtering mode for removing the harmonic signal;

the filtering stop mode for not removing the harmonic signal; and an initial charging mode for performing initial charging to a harmonic storage capacitor.

12. The device of claim 11, further comprising a controller that, by determining whether or not the initial charging of the harmonic storage capacitor is required, is configured to set the filter to the initial charging mode when it is determined that the initial charging is required and to the filtering mode when it is determined that the initial charging has been completed.

13. The device of claim 12, wherein whether or not the initial charging of the harmonic storage capacitor is required is determined based on a comparison result of a voltage of the harmonic storage capacitor and a first threshold value.

14. The device of claim 13, wherein the first threshold value is determined based on a voltage of the battery.

15. The device of claim 12, wherein whether or not the initial charging has been completed is determined based on a comparison result between a voltage of the harmonic storage capacitor and a second threshold value.

16. The device of claim 15, wherein the second threshold value is determined based on a voltage of the battery.

17. A charging power filtering method, the method comprising:

receiving a signal instructing whether or not a filtering request is required from an on-board charger;

selecting a mode of a plurality of modes for driving a filter based on the signal instructing whether or not the filtering request is required, wherein the filter is connected in parallel to the on-board charger and wherein the plurality of modes comprises a filtering mode for removing a harmonic signal, a filtering stop mode for not removing the harmonic signal, and an initial charging mode for performing initial charging to a harmonic storage capacitor; and charging a battery using the selected mode.

18. The method of claim 17, wherein, by determining whether or not the initial charging of the harmonic storage capacitor is required, selecting the mode of the plurality of modes further comprises:

performing the initial charging mode when it is determined the initial charging is required; and switching to the filtering mode when it is determined that the initial charging has been completed.

19. The method of claim 18, wherein whether or not the initial charging of the harmonic storage capacitor is required is determined based on a comparison result of a voltage of the harmonic storage capacitor and a first threshold value.

20. The method of claim 19, wherein the first threshold value is determined based on a voltage of the battery.

* * * * *